US010327429B2

(12) United States Patent
Miller et al.

(10) Patent No.: US 10,327,429 B2
(45) Date of Patent: Jun. 25, 2019

(54) INCORPORATION OF GRAPHENE IN VARIOUS COMPONENTS AND METHOD OF MANUFACTURING

(71) Applicant: G-Rods International, Plano, TX (US)

(72) Inventors: Vanhdy Miller, Sachse, TX (US); Glenn Miller, Sachse, TX (US); Chi Kai Tseng, Taipei (TW)

(73) Assignee: G-Rods International LLC, Plano, TX (US)

( * ) Notice: Subject to any disclaimer, the term of this patent is extended or adjusted under 35 U.S.C. 154(b) by 133 days.

(21) Appl. No.: 15/204,885

(22) Filed: Jul. 7, 2016

(65) Prior Publication Data

US 2016/0353724 A1 Dec. 8, 2016

Related U.S. Application Data

(63) Continuation-in-part of application No. 14/728,022, filed on Jun. 2, 2015, now Pat. No. 10,064,400.
(Continued)

(51) Int. Cl.
*A01K 87/00* (2006.01)
*B29C 70/32* (2006.01)
(Continued)

(52) U.S. Cl.
CPC .............. *A01K 87/00* (2013.01); *B29C 70/32* (2013.01); *B29C 70/34* (2013.01);
(Continued)

(58) Field of Classification Search
CPC .................. A01M 87/00; B29C 70/34; B29K 2105/0881; B29K 2507/04
See application file for complete search history.

(56) References Cited

U.S. PATENT DOCUMENTS

| 3,385,569 A | 5/1968 | Bookout |
| 4,043,074 A | 8/1977 | Airhart |

(Continued)

FOREIGN PATENT DOCUMENTS

| CN | 103552325 A | 2/2014 |
| JP | 2013256099 A | 12/2013 |

(Continued)

OTHER PUBLICATIONS

"Fusion Fishing Rods," Fusion Fishing Rods Outdoor Gear/Sporting Goods, https://www.facebook.com/Fusion-FishingRods-194703340684812/?fref=ts, downloaded Dec. 10, 2015, 1 page.
(Continued)

*Primary Examiner* — Christopher P Ellis
(74) *Attorney, Agent, or Firm* — Wei Wei Jeang; Grable Martin Fulton PLLC (57) ABSTRACT

A component comprises a hollow component having a plurality of prepreg layers, where each prepreg layer includes a graphene-resin mixture comprising a resin and a graphene preparation evenly disposed throughout the resin. The component further includes a fiber cloth impregnated with the graphene-resin mixture. The plurality of prepreg layers are applied and pressed together in alternate layers of graphene-resin mixture and fiber cloth to form the hollow component.

21 Claims, 7 Drawing Sheets

Related U.S. Application Data (60) Provisional application No. 62/272,797, filed on Dec. 30, 2015, provisional application No. 62/190,053, filed on Jul. 8, 2015.

(51) Int. Cl.
| | | |
|---|---|---|
| *B29C 70/34* | (2006.01) | |
| *B29K 105/08* | (2006.01) | |
| *B29K 105/16* | (2006.01) | |
| *B29K 507/04* | (2006.01) | |
| *B29L 31/52* | (2006.01) | |
| *B29L 31/30* | (2006.01) | |

(52) U.S. Cl.
CPC .. *B29K 2105/0881* (2013.01); *B29K 2105/16* (2013.01); *B29K 2507/04* (2013.01); *B29K 2905/02* (2013.01); *B29L 2031/3005* (2013.01); *B29L 2031/3091* (2013.01); *B29L 2031/52* (2013.01); *B29L 2031/5227* (2013.01); *B29L 2031/5236* (2013.01); *B29L 2031/5272* (2013.01)

(56) References Cited

U.S. PATENT DOCUMENTS

| | | | | |
|---|---|---|---|---|
| 4,132,579 | A | 1/1979 | VanAuken | |
| 4,178,713 | A | 12/1979 | Higuchi | |
| 4,987,175 | A | 1/1991 | Bunnell | |
| 5,645,925 | A * | 7/1997 | Sheppard | C08G 69/04 252/182.17 |
| 5,897,447 | A | 4/1999 | Nishihara | |
| 6,071,460 | A | 6/2000 | Renaudin et al. | |
| 6,709,347 | B1 * | 3/2004 | Ono | A01K 87/00 473/319 |
| 6,986,876 | B2 | 1/2006 | Smalley et al. | |
| 7,151,129 | B2 | 12/2006 | Ishikawa et al. | |
| 8,342,989 | B2 | 1/2013 | Lammer | |
| 8,647,548 | B1 * | 2/2014 | Humfeld | C08J 3/20 264/137 |
| 8,894,517 | B2 | 11/2014 | Lammer | |
| 9,421,739 | B2 * | 8/2016 | Humfeld | C08K 9/04 |
| 9,434,826 | B2 * | 9/2016 | Humfeld | C08J 5/06 |
| 2006/0025515 | A1 * | 2/2006 | Scaringe | B82Y 30/00 524/496 |
| 2006/0160636 | A1 * | 7/2006 | Palumbo | A01K 87/00 473/316 |
| 2006/0251877 | A1 * | 11/2006 | Pirazzini | A01K 87/00 428/292.1 |
| 2010/0125013 | A1 * | 5/2010 | Lammer | B29C 70/025 473/547 |
| 2010/0219383 | A1 | 9/2010 | Eklund | |
| 2011/0220235 | A1 * | 9/2011 | Cameron | B29C 70/025 138/109 |
| 2012/0251925 | A1 | 10/2012 | Sasaki | |
| 2012/0298396 | A1 * | 11/2012 | Hong | D01F 9/127 174/107 |
| 2013/0309926 | A1 * | 11/2013 | Tarumoto | B82Y 30/00 442/111 |
| 2014/0113086 | A1 | 4/2014 | Greenhill et al. | |
| 2014/0121350 | A1 * | 5/2014 | You | C08G 73/105 528/422 |
| 2016/0002390 | A1 * | 1/2016 | Hughes | C08J 5/24 523/427 |
| 2016/0193751 | A1 * | 7/2016 | Humfeld | C08J 5/042 428/323 |
| 2016/0194460 | A1 * | 7/2016 | Humfeld | C08J 5/042 428/408 |

FOREIGN PATENT DOCUMENTS

| | | |
|---|---|---|
| WO | 2014102603 A1 | 7/2014 |
| WO | 2014107725 A9 | 9/2014 |
| WO | 2015042036 A1 | 3/2015 |

OTHER PUBLICATIONS

Graphene sci fi rods, Sealine—South African Angling and Boating Community, http://www.sealine.co.za/view_topic.php?id=88933&forum_id=1, posted Dec. 13, 2013, 3 pages.

"The Race to a Graphene Spey Rod?," Spey Clave Casting Forums, http://www.speypages.com/speyclave/59-Rods/43087-race-graphene-spey-rod.html, Oct. 18, 2010, 7 pages.

International Search Report and Written Opinion received in Patent Cooperation Treaty Application No. PCT/US16/035551, dated Oct. 7, 2016, 11 pages.

International Search Report and Written Opinion received in Patent Cooperation Treaty Application No. PCT/US16/041409, dated Oct. 11, 2016, 11 pages.

Shen, Ming-Yuan, et al., "Mechanical Properties and Tensile Fatigue of Graphene Nanoplatelets Reinforced Polymer Nanocomposites," Journal of Nanomaterials, vol. 2013, May 31, 2013, 10 pages.

Smith, Ethan, "Graphene: The next Fly Rod Material, perhaps?," The Fiddle and Creel, https://fiddleandcreel.wordpress.com/2011/04/21graphene-the-next-fly-rod-material-perhaps, Apr. 21, 2011, 3 pages.

* cited by examiner

INCORPORATION OF GRAPHENE IN VARIOUS COMPONENTS AND METHOD OF MANUFACTURING

RELATED APPLICATIONS

The present application is a Continuation-In-Part Application of U.S. Non-Provisional application Ser. No. 14/728,022 filed Jun. 2, 2015, entitled "Fishing Rod With Graphene and Method of Manufacturing." This application also claims the benefit of U.S. Provisional Application Ser. No. 62/190,053 filed Jul. 8, 2015, entitled, "Sporting Equipment with Graphene and Method of Manufacturing," and U.S. Provisional Application Ser. No. 62/272,797 filed Dec. 30, 2015, entitled, "Incorporation of Graphene in Various Components and Method of Manufacturing."

FIELD

The present disclosure relates to the incorporation of graphene in various components and method of manufacturing.

BACKGROUND

Fishing rod technology has evolved from the bamboo poles of yester years to today's fishing rods reinforced with graphite, fiberglass, and resin. Anglers desire fishing rods that are light-weight, durable, sensitive, and powerful. They want rods that are easy to handle and carry, have the right amount of stiffness or flexibility to enable casting and placing the lure in the water where the fish are located, and have sufficient strength and integrity to lift the catch out of the water. The term "action" is used to describe how much of the rod deflects or bends when pressure is put on its tip. In general, a fast action rod bends less than one that is a slow or moderate action rod of the same type. For example, most bass rod actions are fast to very fast to provide better sensitivity and faster power for setting the hook. The type of lure that will be used also should be considered when selecting a fishing rod. "Power" is a term used to describe the strength or lifting ability of the rod. The power of the rod is described using heavy, medium heavy, medium, etc. In general, the power of the rod should be compatible with the weight of the fishing line that will be used. Another term used to describe fishing rods is "responsiveness." This term is used to describe the ability of the entire rod to flex under load and then return to the original state when the load is released. In general, the lighter the rod, the more responsive it is to load conditions. Much experimentation and research have been devoted to constructing the perfect rod.

In addition to the fishing rod, it is desirable for many other types of sporting equipment and other types of components to also possess the same characteristics described above, including light weight, elasticity, and strength.

DETAILED DESCRIPTION

Many sporting equipment such as fishing rods, golf clubs, arrows, bows, snow skis and poles, water skis, bicycle frames, walking/hiking sticks, boards used in board sports (e.g., surf boards, skateboards, windsurfing boards, paddleboards, kitesurfing boards, kneeboards, wakeboards, snowboards, etc.), sports helmets, bats, and other applications such as horse sulky, car body skin, car body panel, helmet, body armor, computing device (mobile phone, tablet, and laptop) outer housing, and other components, motorcycle body parts, boat hull and body components, airplane fuselage and wing components, helicopter blade and body components, and ultralight aircraft frames are also ideal applications of graphene construction to take advantage of the inherent strength, elasticity, and light weight of this material. Due to the strength of its 0.142 Nm-long carbon bonds, graphene is the strongest material ever discovered, with an ultimate tensile strength of 130,000,000,000 Pascals (or 130 gigapascals), compared to 400,000,000 for A36 structural steel, or 375,700,000 for Aramid (Kevlar). Not only is graphene extraordinarily strong, it is also very light at 0.77 milligrams per square meter (for comparison purposes, 1 square meter of paper is roughly 1000 times heavier). It is often said that a single sheet of graphene (being only 1 atom thick), sufficient in size enough to cover a whole football field, would weigh under 1 single gram.

Figure 1:
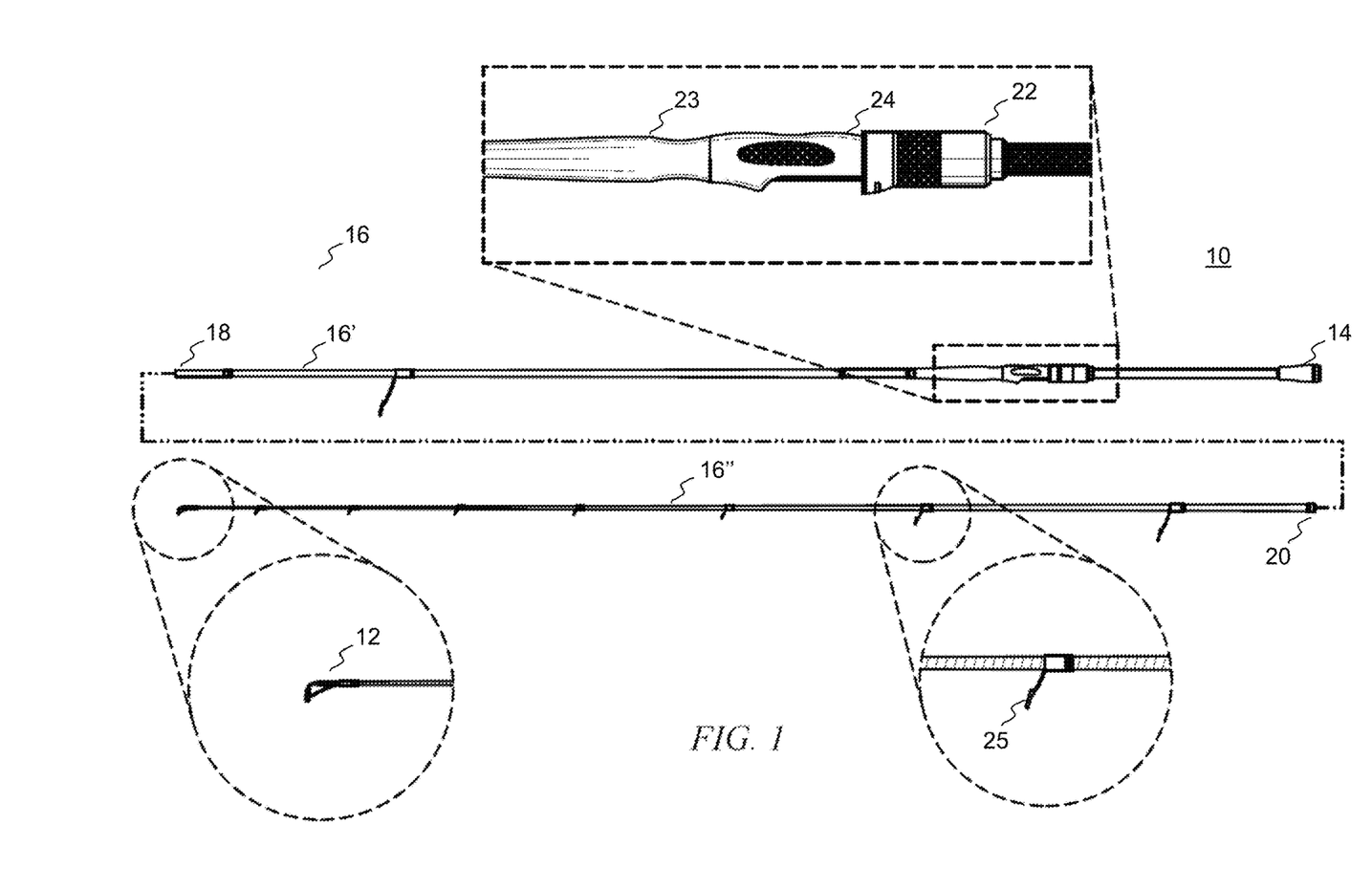
FIG. 1 is a perspective view of an exemplary embodiment of a fishing rod with graphene according to the present disclosure.

FIG. 1 is a perspective view of an exemplary embodiment of a sporting equipment, more specifically, a fishing rod 10 with graphene according to the present disclosure. The fishing rod 10 includes a rod tip 12 at the distal end, a rod butt 14 at the proximal end, and a hollow rod blank 16 that is preferably constructed in one or more sections 16' and 16" to facilitate storage and transport. The embodiment shown in FIG. 1 comprises two rod blank sections 16' and 16" that may be joined together. The two sections may be joined by a ferrule joint, in which the end 18 of one section 16' can be inserted into the ferrule aperture 20 of the other section 16". Other suitable methods of joining the rod blank sections may be incorporated. The rod blank sections are preferably tapered, tubular, and hollow. However, rod blanks having cross-sections of other shapes (e.g., triangle, square, hexagon, octagon, etc.) that are hollow or filled with lightweight materials are also contemplated.

The fishing rod 10 may further include a grip or handle 22 located at or near the proximal end of the rod, and another portion of the handle 23 disposed proximate to a reel seat 24 for securing a fishing reel (not explicitly shown). The rod further includes a plurality of fishing line guides 25 disposed along a longitudinal axis of the rod. The fishing rod blank sections are formed and manufactured by a novel manufacturing process using a layered construction of fiber cloth and a resin with graphene incorporated therein.

Figure 2:
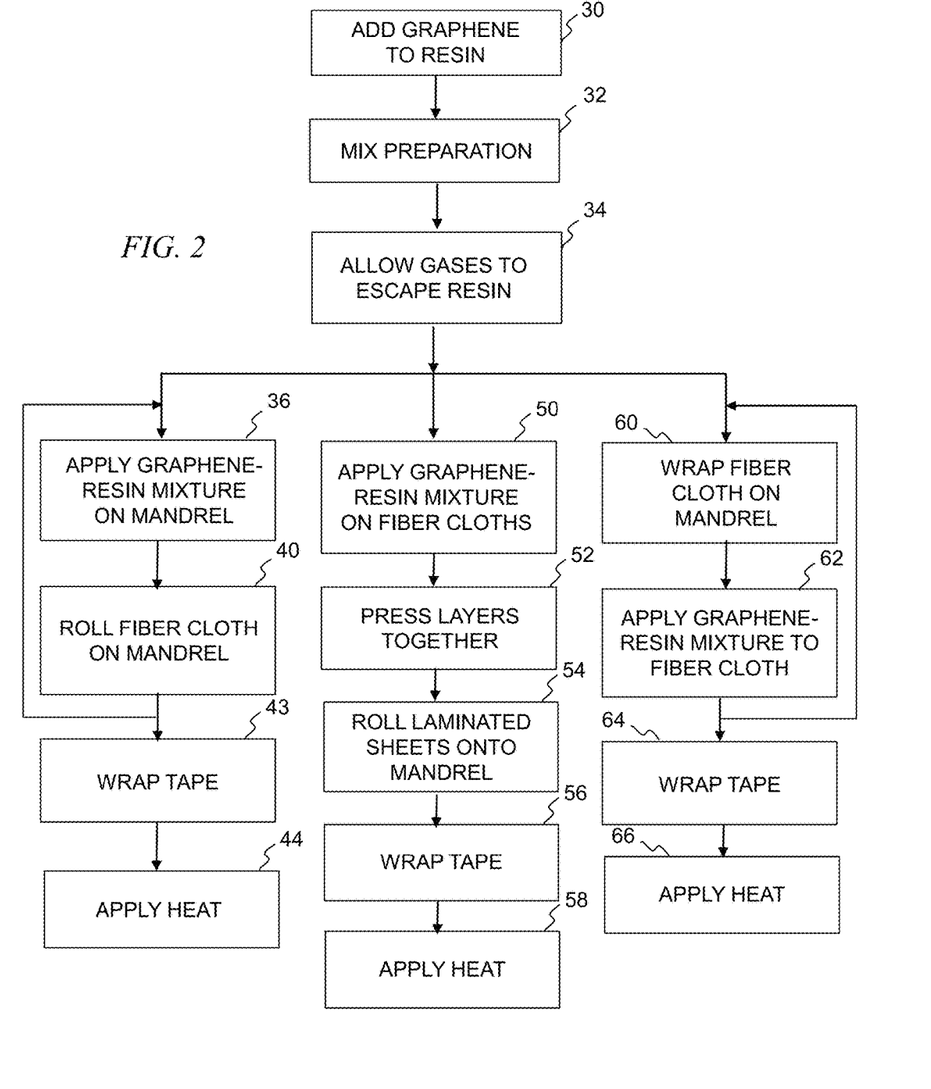
FIG. 2 is a simplified flowchart of exemplary manufacturing processes for making a fishing rod blank with graphene according to the present disclosure.
Figure 3:
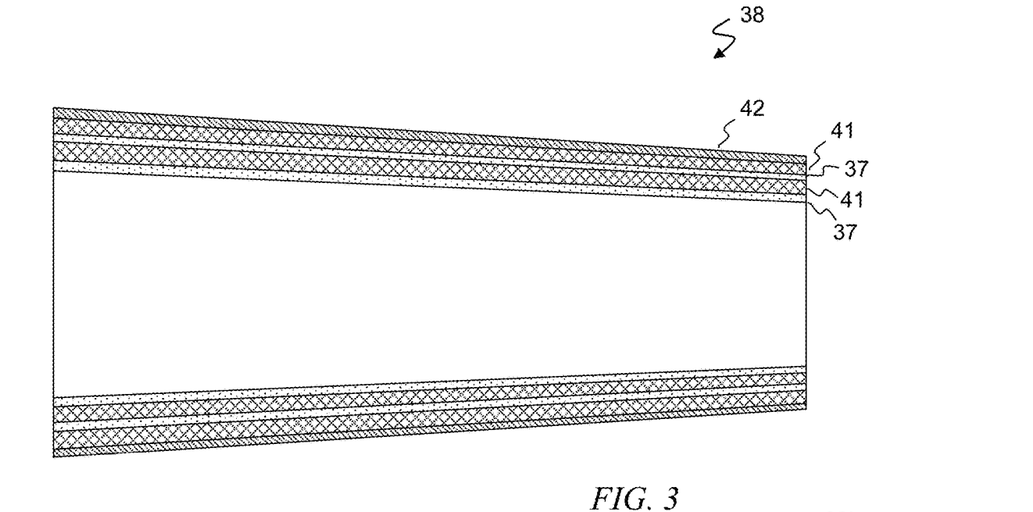
FIG. 3 is a cross-sectional view of an exemplary embodiment of a fishing rod blank with graphene according to the present disclosure.
Figure 4:
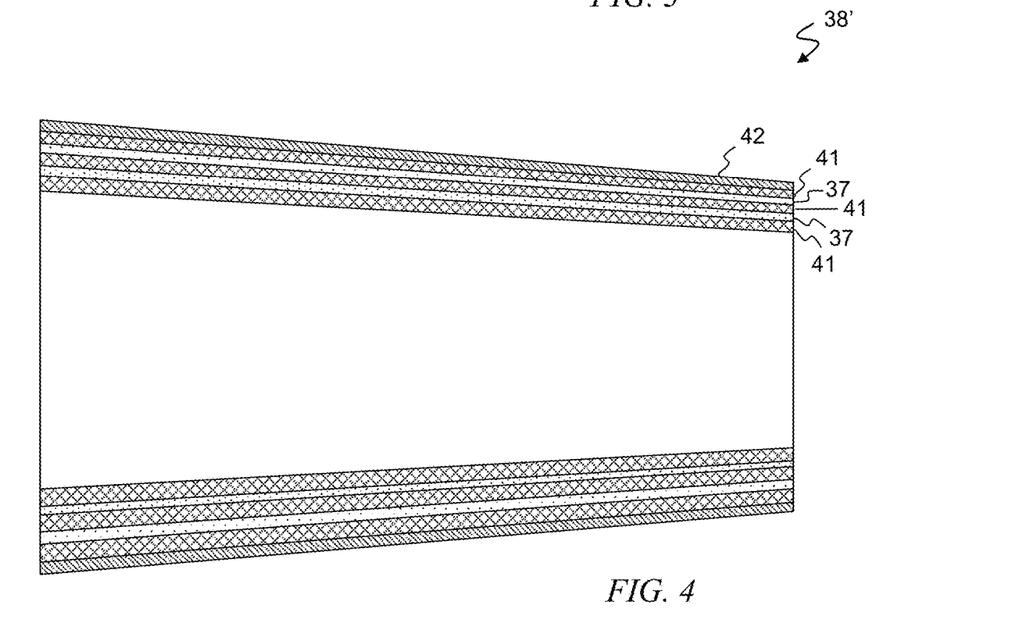
FIG. 4 is a cross-sectional view of another exemplary embodiment of a fishing rod blank with graphene according to the present disclosure.

FIG. 2 is a simplified flowchart of exemplary manufacturing processes for making sporting equipment and other components incorporating graphene according to the present disclosure, and references will be made to FIGS. 3 and 4 showing cross-sectional views of exemplary embodiments of sporting equipment and other components incorporating graphene. It should be noted that the drawings are not necessarily to scale and in some instances proportions have been exaggerated in order to more clearly depict certain features.

As shown in block 30 of FIG. 2, graphene is added to a resin. The resin may be a polyester resin, a vinylester resin, an epoxy resin, and/or any other suitable resin now known or to be developed. Graphene is an allotrope of carbon in the form of two-dimensional, atomic-scale, hexagonal lattice in which one atom forms each vertex. Graphene is a single planar sheet of sp2-bonded carbon atoms that are densely packed in a honeycomb crystal lattice. The graphene may be formed into powders, nano-powders, nanotube powders, particles, flakes, pellets, tapes, sheets, nanotubes, or other forms prior to being mixed or incorporated with the resin. In one embodiment, the graphene particles may be nanoparticles commonly referred to as graphene nano-powder. Graphene is superior to other materials such as graphite and fiberglass in strength, elasticity, stiffness, light weight, and other properties. The graphene and the resin (in liquid form) are mixed together or incorporated slowly for a period of time such as, for example, ten minutes, to evenly distribute the graphene nano-particles within the resin, as shown in block 32. The graphene may constitute about ten percent (10%) of the resultant resin preparation by weight. It should be noted that the percentage can be adjusted upward or downward depending on the desired characteristics of the finished product. The resin mixture is then set aside to allow gases trapped in the resin to rise and escape, as shown in block 34. To assist in ridding the trapped bubbles in the resin mixture, an application of vibrations, ultrasound, vacuum, and other treatment may be used. In another embodiment, in addition to the incorporation of graphene nano-powder, a carbon nanotube powder may be incorporated with the resin to form a resin mixture.

In one embodiment of the manufacturing process, the graphene-resin mixture is then applied to a steel mandrel (not shown), as shown in block 36. For example, the graphene-resin mixture can be brushed onto the mandrel so that it evenly coats the mandrel on all sides. The graphene-resin mixture can be applied to the entire length of the mandrel or to only one or more selective sections of the mandrel. As shown in FIG. 3, this application of the graphene-resin mixture on the mandrel forms the most inner layer 37 of the component 38. In block 40, a woven or non-woven fiber cloth 41 constructed of materials that may include, e.g., graphene fibers, graphene nanotubes, carbon fibers, carbon nanotube sheets, carbon nanotube fibers, graphite fibers, boron fibers, glass fibers, silicon carbide fibers, ceramic fibers, KEVLAR fibers, and/or aramid fibers (or a combination of two or more of these materials), is applied or rolled onto the mandrel over the graphene-resin mixture layer 37 of the component 38 (FIG. 3). For example, 1K carbon fiber cloth (one thousand filaments in one roving or skein), 2K carbon fiber cloth (two thousand filaments in one roving or skein), 3K carbon fiber cloth (three thousand filaments in one roving or skein), X carbon fiber cloth (two-directional weave), or unidirectional carbon fiber cloth (one directional weave) may be used. A special rolling machine may be used to tightly roll the fiber cloth onto the mandrel.

These two steps 36 and 40 form a prepreg (preimpregnated) layer that includes the fiber cloth layer 41 impregnated with the graphene-resin mixture 37. These two steps 36 and 40 are repeated to add multiple layers of graphene-resin layer 37 and fiber cloth 41 as shown in FIG. 3. The number of prepreg layers used to construct a component 38 is dependent on the desired characteristics for the component. For example, the number of prepreg layers used to construct a rod blank depends on the type of rod being made, the action, speed, and power of the rod, and other desired characteristics of the rod.

An exemplary rod blank or component may comprise a first graphene-resin layer, a unidirectional carbon fiber cloth layer (with the orientation of the fibers running longitudinally), a second graphene-resin layer, an X carbon fiber cloth layer, a third graphene-resin layer, a unidirectional carbon fiber cloth layer (with the orientation of the fibers running circumferentially), a fourth graphene-resin layer, and a 1K carbon fiber cloth layer. Any of these layers may cover all of the component/rod blank or only selected portions thereof. For example, the 1K carbon layer may be applied to the proximal end of the rod up to the first line guide.

After the desired number of prepreg layers are formed and pressed together, a long continuous tape 42 (FIG. 3) is tightly wrapped helically around the outermost layer of the rod blank, as shown in block 43. The tape 42 provides waterproof properties and can be made of cellophane and/or other suitable materials. In block 44, heat is applied to cure the resin. For example, the rod blank or component 38 may be baked at approximately 130 degrees Celsius for approximately 150 minutes. The bake temperature and duration may be determined based on the type of resin used in the process. It should be understood that the application of the tape is optional.

In another exemplary embodiment of the manufacturing process, the graphene-resin mixture 37 is applied directly to individual sheets of fiber cloth 41 to form multiple layers of prepreg, as shown in block 50. As described above, the fiber cloth may be woven or non-woven, and may include graphene fibers, carbon fibers, carbon nanotube sheets, carbon nanotube fibers, graphite fibers, boron fibers, glass fibers, silicon carbide fibers, ceramic fibers, KEVLAR fibers, and/or aramid fibers (or a combination of two or more of these materials). Examples of carbon fiber cloth may further include 1K carbon fiber cloth (one thousand filaments in one roving or skein), 2K carbon fiber cloth (two thousand filaments in one roving or skein), 3K carbon fiber cloth (three thousand filaments in one roving or skein), X carbon fiber cloth (two-directional weave), or unidirectional carbon fiber cloth (one directional weave). The graphene-resin mixture may be brushed onto each fiber cloth or the graphene-resin mixture can be applied between each layer of fiber cloth. When the desired number of prepreg (fiber cloth and resin) layers have been applied together, a pressing machine may be used to tightly press and adhere the prepreg layers, as shown in block 52. The number of prepreg layers used to construct the component depends on the desired characteristics for the component 38'. For example, the number of prepreg layers used to construct a rod blank depends on the type of rod being made, the action, speed, and power of the rod, and other desired characteristics of the rod. Any of the prepreg layers may cover all of the component or only selected portions thereof. For example, the 1K carbon layer may be applied to the proximal end of the rod up to the first line guide. The prepreg layers are then rolled onto the mandrel using a rolling machine, as shown in block 54. Thereafter, a long continuous tape 42 is tightly wrapped helically around the outermost layer of the rod blank, as shown in block 56. The tape 42 provides waterproof properties and can be made of cellophane and/or other suitable materials. In block 58, heat is applied to cure the resin. For example, the component may be baked at approximately 130 degrees Celsius for approximately 150 minutes. The bake temperature and duration may be determined based on the type of resin used in the manufacturing process. The application of the tape is optional.

In a third exemplary embodiment of the manufacturing process, a sheet of fiber cloth, such as carbon cloth, is wrapped on the mandrel, as shown in block 60. As described above, the fiber cloth may be woven or non-woven, and may include graphene fibers, carbon fibers, carbon nanotube sheets, carbon nanotube fibers, graphite fibers, boron fibers, glass fibers, silicon carbide fibers, ceramic fibers, KEVLAR fibers, and/or aramid fibers (or a combination of two or more of these materials). Examples of carbon fiber cloth may further include 1K carbon fiber cloth (one thousand filaments in one roving or skein), 2K carbon fiber cloth (two thousand filaments in one roving or skein), 3K carbon fiber cloth (three thousand filaments in one roving or skein), X carbon fiber cloth (two-directional weave), or unidirectional carbon fiber cloth (one directional weave). The graphene-resin mixture is then applied or brushed onto the carbon cloth, as shown in block 62. This process is repeated until the desired number of prepreg (fiber cloth and resin) layers has been formed over the mandrel. The number of prepreg layers used to construct the component is dependent on desired characteristics for the component. For example, the number of prepreg layers used to construct a rod blank depends on the type of rod being made, the action, speed, and power of the rod, and other desired characteristics of the rod. Any of the prepreg layers may cover all of the component or only selected portions thereof. For example, the 1K carbon layer may be applied to the proximal end of the rod up to the first line guide. Thereafter, a long continuous tape 42 such as a cellophane tape is tightly wrapped helically around the outermost layer of the component, as shown in block 64. The tape 42 provides waterproof properties and can be made of cellophane and/or other suitable materials. In block 66, heat is applied for a predetermined duration to cure the resin. For example, the rod blank may be baked at approximately 130 degrees Celsius for approximately 150 minutes. The bake temperature and duration may be determined based on the type of epoxy resin used. The application of the tape is optional.

It may be seen in FIGS. 3 and 4 that the component may incorporate the fiber cloth and graphene-resin mixture alternately. The inner-most layer of the component may be the graphene-resin mixture 37 or the fiber cloth 41. The layers of fiber cloth can be woven or non-woven and made from materials such as graphene fibers (and other forms of preparations), carbon fibers, carbon sheets, carbon nanotube sheets, carbon nanotube fibers, boron fibers, glass fibers, silicon carbide fibers, ceramic fibers, aramid (e.g., KEVLAR) fibers, and/or a combination of these materials. The fiber cloth may be arranged in a single ply or a plurality of plies. Because graphene possesses superior strength by weight and other qualities compared to other materials, graphene is hereby incorporated into the construction of a component that provides the desirable characteristics. For example, the desired speed, action, power, and sensitivity one looks for in a high quality fishing rod will dictate the construction and materials. The graphene preparation may be in powder, nano-powder, nanotube powder, particle, flake, pellet, tape, nanotube, and sheet form. Further as described above, graphene may also be incorporated into the fiber cloth where the fibers are oriented in uni-directional and/or multi-directional construction.

After the component is cured, it may be cut into the desired shape and/or length. For example, for constructing a fishing rod, the rod blank may be cut into the desired length and the handle and line guides are affixed or adhered to the rod blank. Preferably, the line guides are positioned along the spine of the rod blank, where the edges of the fiber cloth meet or slightly overlap along the length of the rod blank. The spine of the rod blank is slightly more stiff than the opposite side of the rod blank. Placing the line guides and reel seat with consideration to the location of the spine improves the performance of the fishing rod. Placing the line guides along the spine or opposite the spine ensures that when the rod is under load, it does not twist when it bends.

For sporting equipment that is not tubular, i.e., in a shaft or rod form, the graphene-resin mixture may be applied to the outer surfaces of a latex bladder of a desired shape and size, and layers of fiber cloth are laid over the graphene-resin mixture (resin combined with graphene in powder, nano-powder, nanotube powder, particle, flake, pellet, tape, nanotube, sheet form, and/or a combination thereof). The graphene-resin mixture and fiber cloth can be applied over the bladder alternately until the desired thickness is achieved. The fiber cloth can be woven or non-woven and made from materials including graphene fibers, carbon fibers, carbon nanotube sheets, carbon nanotube fibers, boron fibers, glass fibers, silicon carbide fibers, ceramic fibers, aramid (e.g., KEVLAR) fibers, and/or a combination of these materials. The fiber cloth may be arranged in a single ply or a plurality of plies. The graphene fibers in the fiber cloth may be oriented uni-directionally or multi-directionally. The bladder wrapped in multiple layers of graphene-resin mixture and fiber cloth (prepreg layers) may then be placed inside a mold, which may be constructed of aluminum. A release agent may be used to coat the inside surfaces of the mold. The bladder is then expanded by injecting air or a gas, and heat may be applied to the mold for a predetermined duration of time to cure the resin. The result is a hollow part or component that has been formed or molded to correspond to the inside shape of the mold. A bicycle frame, for example, may be constructed of multiple parts formed separately in individual molds and then assembled and secured with an adhesive.

It should be noted that multiple layers of fiber cloth containing a graphene preparation in one or more forms may be alternately arranged with a resin, whether or not containing graphene, to construct the sporting equipment.

Figure 5:
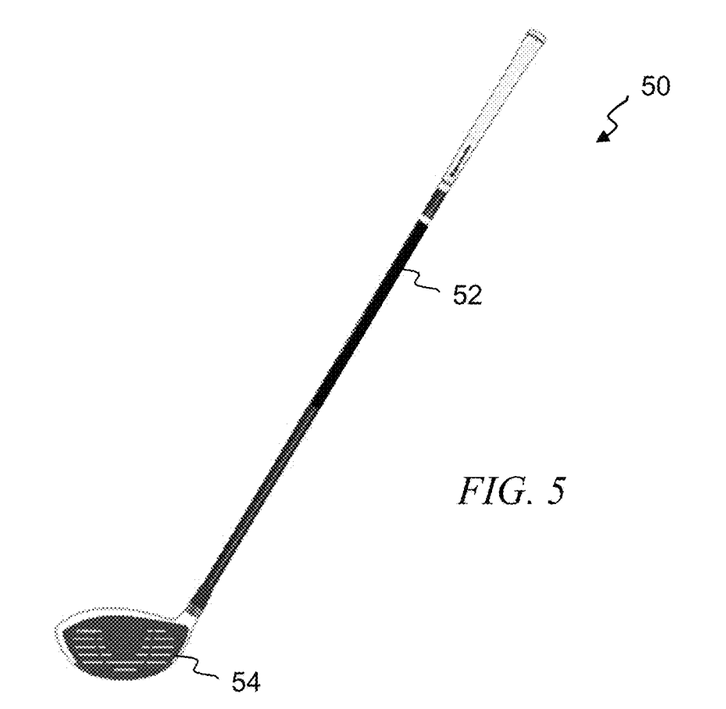
FIG. 5 is a perspective view of an exemplary embodiment of a golf club with graphene according to the present disclosure.

FIG. 5 is a perspective view of an exemplary embodiment of a golf club 50 incorporating graphene according to the present disclosure. The golf club 50 includes a shaft 52 and a club head 54. The club shaft 52, for example, may be constructed using the method incorporating graphene described above.

Figure 6:
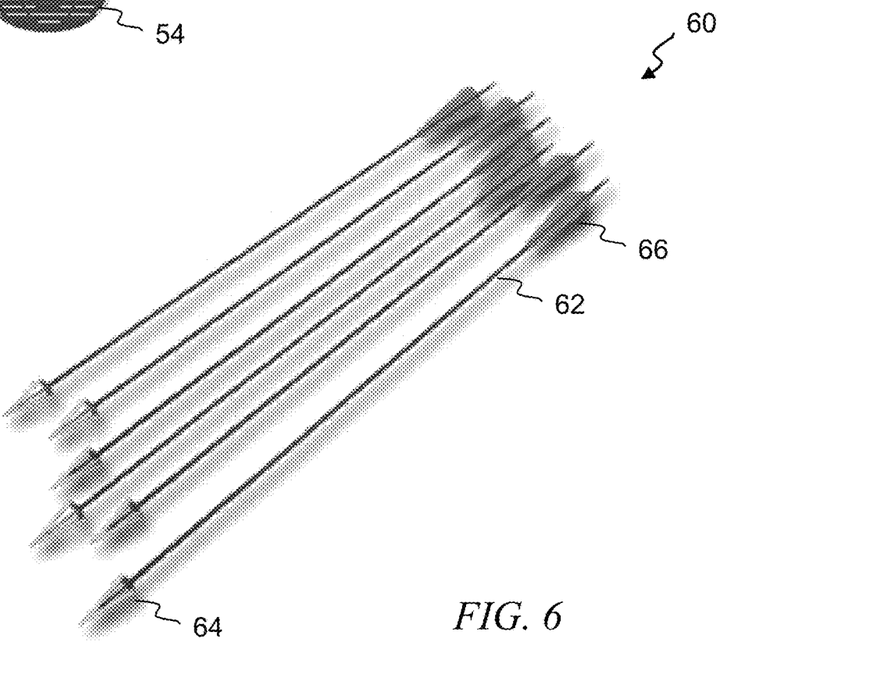
FIG. 6 is a perspective view of an exemplary embodiment of an arrow with graphene according to the present disclosure.

FIG. 6 is a perspective view of an exemplary embodiment of archery arrows 60 incorporating graphene according to the present disclosure. An arrow 60 includes a shaft 62 with an arrow head or pile 64 at one end and a fletching 66 at the other end. The shaft 62 of the arrow 60, for example, may be constructed using the method incorporating graphene as described above.

Figure 7:
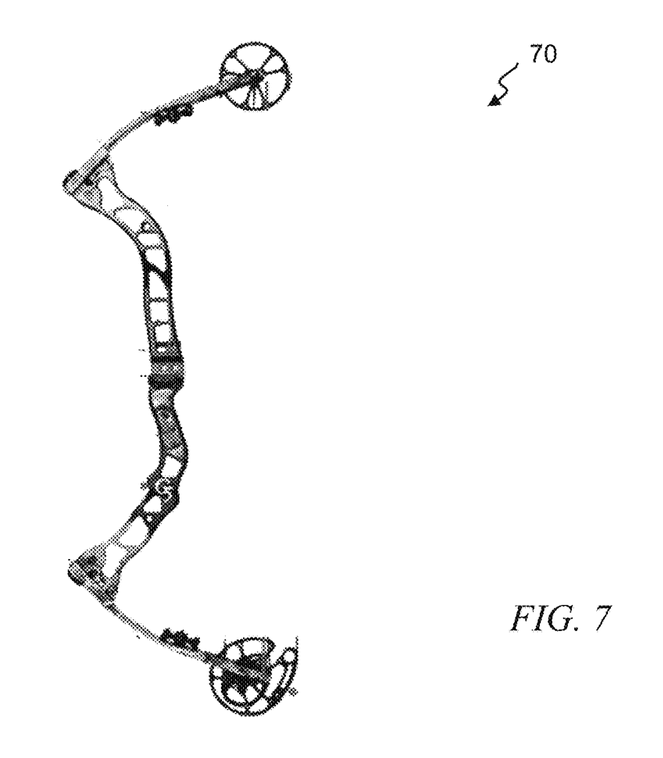
FIG. 7 is a perspective view of an exemplary embodiment of a compound bow with graphene according to the present disclosure.

FIG. 7 is a perspective view of an exemplary embodiment of a compound bow 70 incorporating graphene according to the present disclosure. The compound bow 70 may be constructed using the method incorporating graphene as described above.

Figure 8:
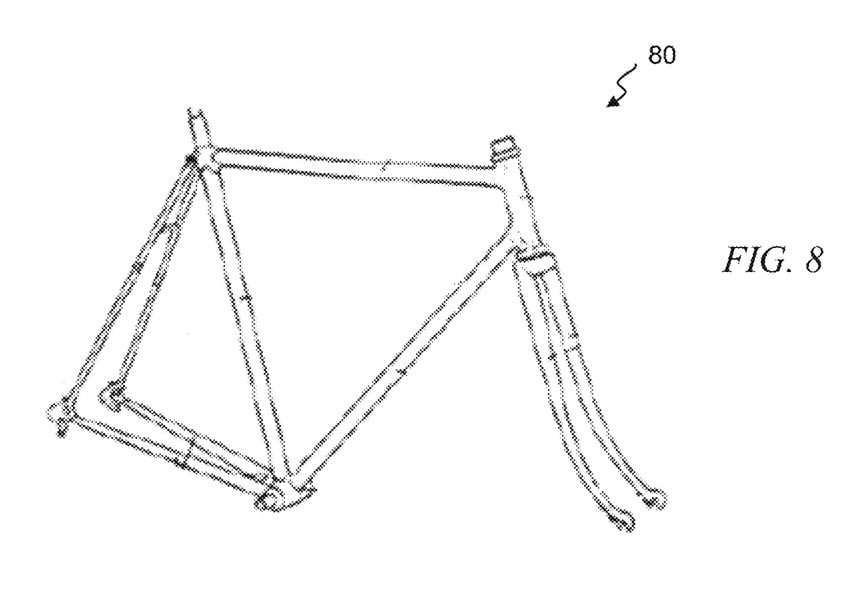
FIG. 8 is a perspective view of an exemplary embodiment of a bicycle frame with graphene according to the present disclosure.

FIG. 8 is a perspective view of an exemplary embodiment of a bicycle frame incorporating graphene according to the present disclosure. All or selected parts of the bicycle frame 80 may be constructed using the method incorporating graphene as described above.

Figure 9:
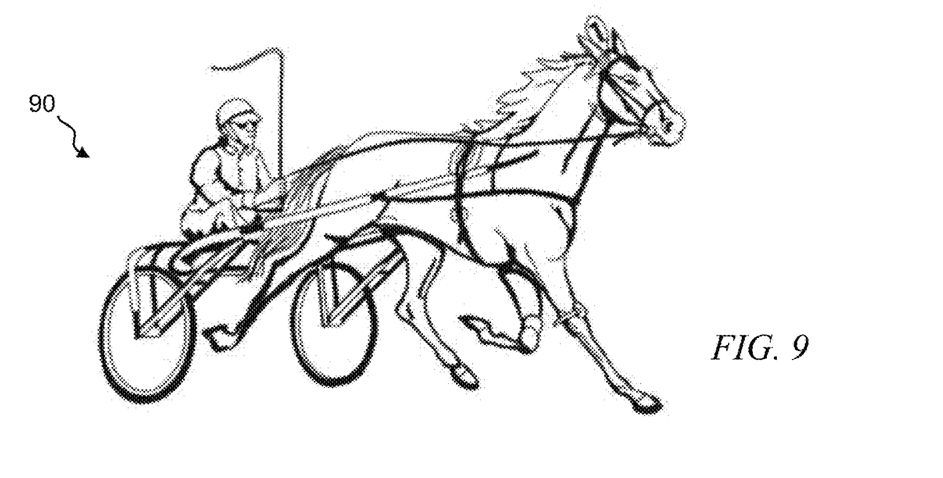
FIG. 9 is a cross-sectional view of another exemplary embodiment of a horse sulky incorporating graphene according to the present disclosure.

FIG. 9 is a perspective view of an exemplary embodiment of a horse sulky 90 incorporating graphene according to the present disclosure. All or selected parts of the horse sulky 90 may be constructed using the method incorporating graphene as described above.

Figure 10:
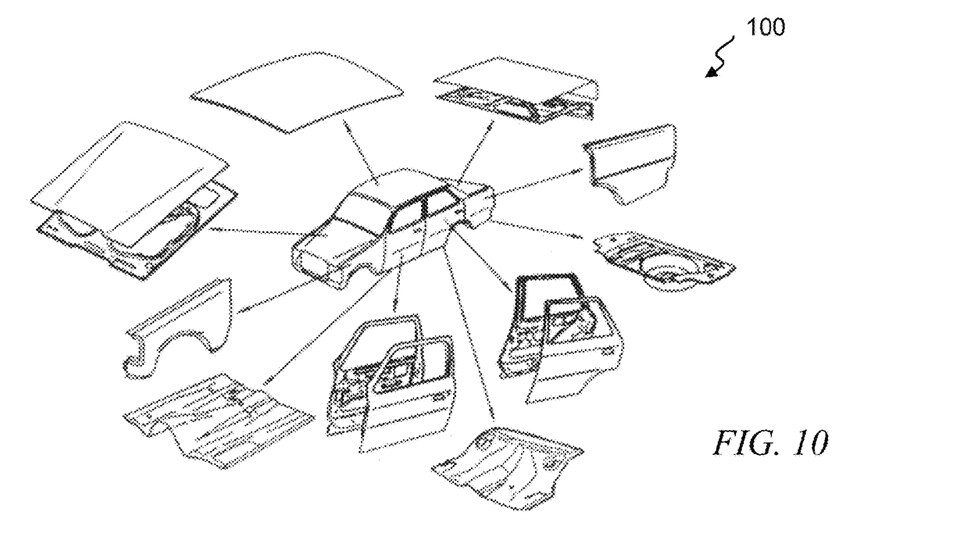
FIG. 10 is a cross-sectional view of another exemplary embodiment of car body components incorporating with graphene according to the present disclosure.

FIG. 10 is a perspective view of an exemplary embodiment of a vehicle 100 with body parts/components incorporating graphene according to the present disclosure. All or selected parts of the vehicle body parts and body panels may be constructed using the method incorporating graphene as described above.

Figures 11, 12:
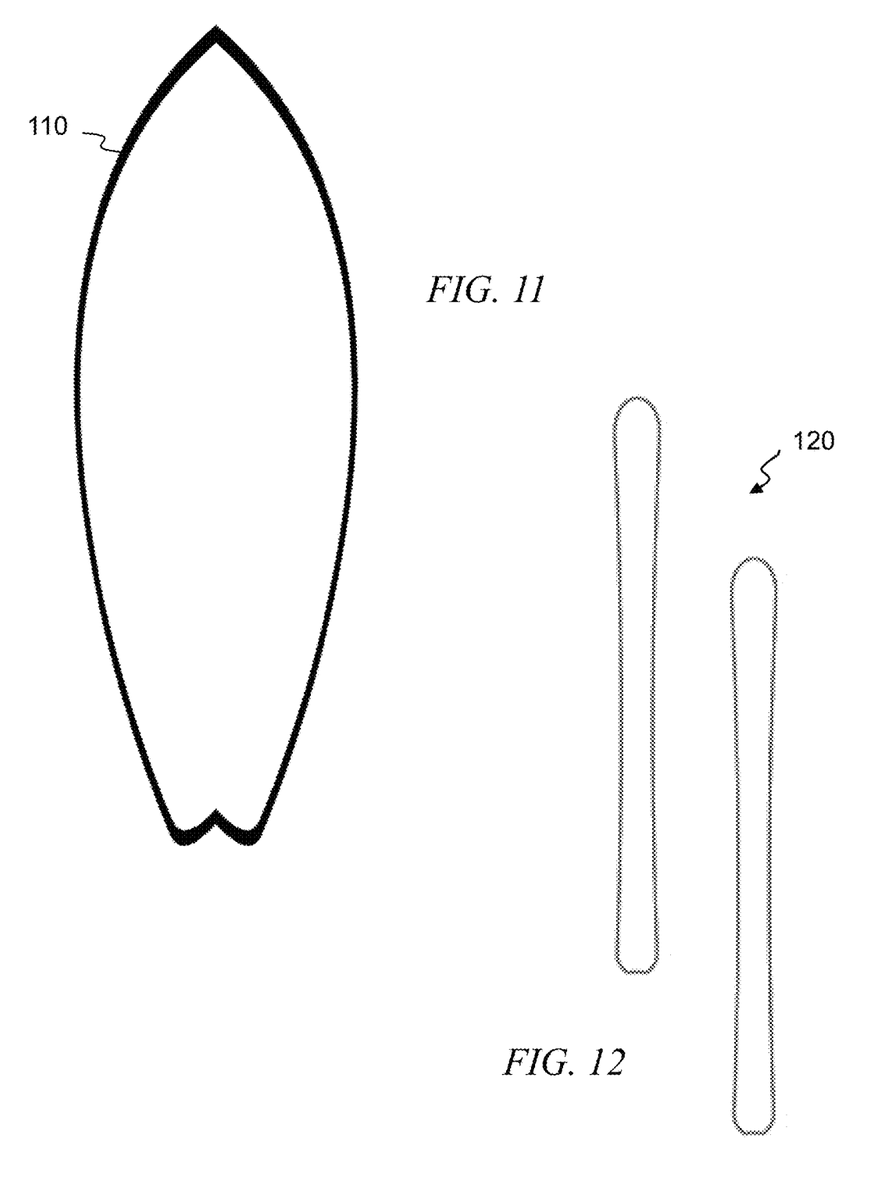
FIG. 11 is a perspective view of an exemplary embodiment of a board incorporating graphene according to the present disclosure.
FIG. 12 is a perspective view of an exemplary embodiment of snow skis incorporating graphene according to the present disclosure.

FIG. 11 is a perspective view of an exemplary embodiment of a board 110 incorporating graphene according to the present disclosure. The board 110 can be a board that is used in any one of the board-based sports, such as surf boards, skateboards, windsurfing boards, paddleboards, kitesurfing boards, kneeboards, wakeboards, snowboards, etc. All or selected parts of the board 110 may be constructed using the method incorporating graphene as described above.

FIG. 12 is a perspective view of an exemplary embodiment of snow skis 120 incorporating graphene according to the present disclosure. All or selected parts of the skis 120 may be constructed using the method incorporating graphene as described above. Although snow skis are shown, the methods of manufacturing the skis incorporating graphene are also applicable to water skis.

It should be understood that the manufacturing methods incorporating graphene in various forms described herein can be used to construct components and parts of various items, including a fishing rod, golf club, arrow, bow, bicycle frame, surf board of various types, skateboard, snowboard, snow and water skis, helmet, body armor, computing device outer housing, horse sulky, car body skin, car body panel, boat hull, airplane fuselage and wing, and helicopter blade and body.

The features of the present invention which are believed to be novel are set forth below with particularity in the appended claims. However, modifications, variations, and changes to the exemplary embodiments described above will be apparent to those skilled in the art, and the sporting equipment and other components incorporating graphene and manufacturing method thereof described herein thus encompasses such modifications, variations, and changes and are not limited to the specific embodiments described herein.

What is claimed is:

1. A sporting equipment comprising:
a component having a plurality of prepreg layers, each prepreg layer comprising:
a graphene-resin mixture comprising a resin and a graphene preparation evenly disposed throughout the resin; and
a fiber cloth impregnated with the graphene-resin mixture, wherein the fiber cloth comprises at least one of graphene fibers, graphene nanotubes, carbon fibers, carbon sheets, carbon nanotube sheets, carbon nanotube fibers, graphite fibers, boron fibers, glass fibers, silicon carbide fibers, ceramic fibers, and aramid fibers;
wherein the plurality of prepreg layers are applied and pressed together in alternate layers of graphene-resin mixture and fiber cloth and shaped to form the component.

2. The sporting equipment of claim 1, wherein the graphene-resin mixture comprises about ten percent graphene by weight.

3. The sporting equipment of claim 1, wherein the graphene preparation comprises graphene nano-particles.

4. The sporting equipment of claim 1, wherein the graphene preparation comprises graphene flakes.

5. The sporting equipment of claim 1, wherein the graphene preparation comprises graphene nanotubes.

6. The sporting equipment of claim 1, wherein the resin comprises at least one of a polyester resin, a vinylester resin, and an epoxy resin.

7. The sporting equipment of claim 1, wherein the fiber cloth comprises woven fibers.

8. The sporting equipment of claim 1, wherein the fiber cloth comprises non-woven fibers.

9. A method of forming a component, comprising:
forming a plurality of prepreg layers, each prepreg layer comprising a graphene-resin mixture comprising a resin and a graphene preparation evenly disposed throughout the resin, and a woven fiber cloth impregnated with the graphene-resin mixture, wherein the woven fiber cloth comprises at least one of graphene fibers, graphene nanotubes, carbon fibers, carbon sheets, carbon nanotube sheets, carbon nanotube fibers, graphite fibers, boron fibers, glass fibers, silicon carbide fibers, ceramic fibers, and aramid fibers;
pressing the plurality of prepreg layers together;
applying heat to the plurality of prepreg layers;
forming and shaping the plurality of prepreg layers into the component.

10. The method of claim 9, wherein forming a plurality of prepreg layers comprises:
mixing a plurality of graphene flakes into a resin and forming the graphene-resin mixture, the graphene flakes comprising about ten percent by weight of the graphene-resin mixture;
applying the graphene-resin mixture to a mandrel;
applying a fiber cloth to the graphene-resin mixture on the mandrel; and
repeating the graphene-resin mixture application and fiber cloth application until a desired number of prepreg layers are applied to the mandrel.

11. The method of claim 9, wherein forming a plurality of prepreg layers comprises:
mixing a plurality of graphene flakes into a resin and forming the graphene-resin mixture, the graphene flakes comprising about ten percent by weight of the graphene-resin mixture;
applying a fiber cloth to a mandrel;
applying the graphene-resin mixture to the fiber cloth on the mandrel;
repeating the fiber cloth application and the graphene-resin mixture application until a desired number of prepreg layers are applied to the mandrel; and repeating the graphene-resin mixture application and fiber cloth application until a desired number of prepreg layers is applied to the mandrel.

12. The method of claim 9, wherein forming a plurality of prepreg layers comprises:
   mixing a plurality of graphene flakes into a resin and forming the graphene-resin mixture;
   applying the graphene-resin mixture to a bladder;
   applying a fiber cloth to the graphene-resin mixture on the bladder; and
   repeating the graphene-resin mixture application and fiber cloth application until a desired number of prepreg layers are applied to the bladder; and
   placing the bladder with the multiple layers of graphene-resin mixture and fiber cloth into a mold.

13. The method of claim 9, further comprising forming the graphene-resin mixture by thoroughly mixing graphene nano-particles into a resin.

14. The method of claim 9, further comprising forming the graphene-resin mixture by thoroughly mixing graphene nanotubes into a resin.

15. The method of claim 9, further comprising forming the graphene-resin mixture by thoroughly mixing graphene flakes into a resin.

16. The method of claim 9, further comprising forming the graphene-resin mixture by thoroughly mixing the graphene preparation into a resin comprising at least one of a polyester resin, a vinylester resin, and an epoxy resin.

17. A body component comprising:
   at least one hollow component formed of a plurality of prepreg layers, each prepreg layer comprising a resin with a graphene preparation evenly disposed throughout the resin, and a graphene fiber cloth impregnated with the resin; and
   wherein the plurality of prepreg layers are applied and pressed together in alternate layers of resin and fiber cloth and shaped to form the at least one hollow component.

18. The body component of claim 17, wherein the resin comprises at least one of a polyester resin, a vinylester resin, and an epoxy resin.

19. The body component of claim 17, wherein the fiber cloth comprises at least one of graphene fibers, graphene nanotubes, carbon fibers, carbon sheets, carbon nanotube sheets, carbon nanotube fibers, graphite fibers, boron fibers, glass fibers, silicon carbide fibers, ceramic fibers, and aramid fibers.

20. The body component of claim 17, wherein the fiber cloth comprises at least one of woven and non-woven fibers.

21. The body component of claim 17, wherein the at least one hollow component is selected from the group consisting of a body component of a fishing rod, golf club, arrow, bow, bicycle frame, surf board, skateboard, snowboard, snow skis, helmet, body armor, computing device outer housing, horse sulky, car body skin, car body panel, boat hull, airplane fuselage and wing, and helicopter blade and body.

* * * * *